G. J. MOTTER.
ANTISLIPPING ATTACHMENT FOR VEHICLE WHEELS.
APPLICATION FILED APR. 20, 1915.
1,159,068. Patented Nov. 2, 1915.
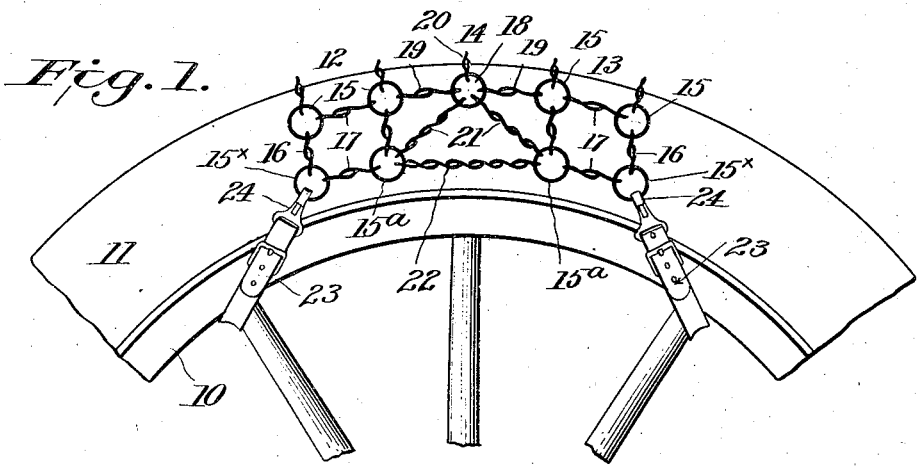
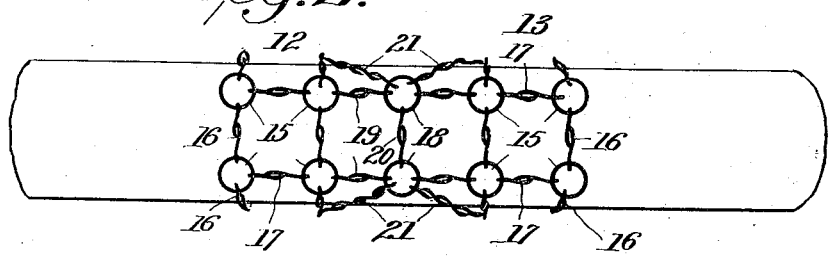
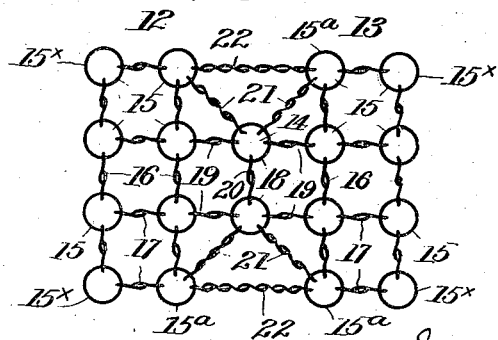
Witnesses
Inventor
George J. Motter
By Hodges & Hodges
Attorney

UNITED STATES PATENT OFFICE.

GEORGE J. MOTTER, OF WASHINGTON, DISTRICT OF COLUMBIA, ASSIGNOR OF ONE-HALF TO GEORGE ROBISON PERRY, OF WASHINGTON, DISTRICT OF COLUMBIA.

ANTISLIPPING ATTACHMENT FOR VEHICLE-WHEELS.

1,159,068.            Specification of Letters Patent.        Patented Nov. 2, 1915.

Application filed April 20, 1915. Serial No. 22,630.

*To all whom it may concern:*

Be it known that I, GEORGE J. MOTTER, a citizen of the United States, residing at Washington, District of Columbia, have invented new and useful Improvements in Antislipping Attachments for Vehicle-Wheels, of which the following is a specification.

This invention is an improved tread mat, or anti-slipping attachment for vehicle wheels of the type provided with pneumatic or cushion tires.

One of the objects of the invention is to provide a mat that will be simple in construction, and which may be readily attached to, or detached from the vehicle wheel, and which will not become tangled when being applied to the wheel.

A further object is to provide an antiskid attachment for vehicle wheels which will not slip circumferentially or "creep" on the wheel, while in operation, and which will conform to the curvature of the tire in all respects, so that the parts will not turn or twist when brought into engagement with the roadway.

The invention will be hereinafter fully set forth and particularly pointed out in the claims.

In the accompanying drawings:—Figure 1 is a side elevation of a vehicle wheel, with my improved tread mat applied thereto. Fig. 2 is an edge view of the wheel, illustrating the invention. Fig. 3 is a view of the tread mat detached and spread out to illustrate the same diagrammatically.

Referring to the drawing, 10 designates a vehicle wheel, which may be of any desired construction, and provided with the usual tire 11. The improved tread mat, designed for attachment to such wheel, comprises two spaced apart tread members 12, 13, and an intermediate tread member 14 interposed between them. The tread members 12 and 13, each comprise a plurality of transversely arranged rows of rings 15, the rings of each row being arranged in spaced relation and connected by links 16. The rings of each row are also arranged opposite the links of the next row, and the opposite rings of the rows of the respective tread members, are connected by longitudinally extended links 17. Thus each tread member 12 and 13 comprises an approximately rectangular member formed of spaced apart rings connected by short links. The intermediate tread member 14 is formed of a single row of rings 18, spaced apart, and arranged transversely of the tire, and parallel with the rows of rings forming the spaced apart tread members. The rings 18 are preferably arranged opposite certain of the rings 15, and are connected to the last mentioned rings by links 19. The rings 18 are also connected by transversely disposed links 20.

In order to properly stay the mat, and prevent the same from creeping when in use, as well as to make the same conform to the curvature of the tire 11, the spaced apart tread members and the intermediate tread members are arranged, as above described, so as to form a mat having its longitudinal edges provided with oppositely disposed gaps between the spaced apart tread members. Diagonally disposed stay chains 21 connect the rings 18 at each end of the intermediate tread member, with the end rings 15$^a$ of the innermost row of rings of the respective spaced apart tread members, *i. e.* the stay chains 21 connect the intermediate tread member with the rings 15$^a$ on the opposite sides of the gaps formed between the spaced apart tread members at the edges of the mat. The last mentioned rings 15$^a$ are also connected by longitudinally disposed stay chains 22 which span the gaps above mentioned. The arrangement is such that the chains 21 and 22 coöperate to form a triangularly disposed stay or insert in the edges of the mat.

The improved antiskid mat, above described, may be attached to the wheel 10 in any suitable or preferred manner. In the drawings, the mat is illustrated as attached to the wheel by means of straps 23, provided with snap hooks 24, engaging the rings 15$^x$ of the spaced apart tread members, the straps being passed around the felly of the wheel, between the spokes. If desired the straps 23 may be made adjustable by means of buckles 25, or other similar devices.

In practice, when it is desired to apply the improved antiskid mat to a vehicle wheel, one snap hook of each strap 23 is disengaged from its ring 15$^x$, and the mat is then spread over the tread of the tire. When in proper position, the straps 23 are passed around the felly of the wheel, and preferably in such spaced relation to each other, that they may have a plurality of spokes between them, and the snap hooks 24, on the free ends of said straps, are then engaged with the rings 15×, thus securely retaining the mat in position. The mat may be disengaged from the wheel by unhooking the snap hooks 24 on either side.

From the foregoing, it will be seen that the improved antiskid mat may be readily and quickly applied to, or removed from the wheel, and will not readily become tangled, and that by providing the triangular flexible insert, the mat is made to conform perfectly to the curvature of the tire in such manner as to insure a proper fit and prevent creeping. The links connecting the rings may be of any construction, but are preferably made in a form that will permit their ends to be readily spread by a suitable tool, so that in case of wear, they may be easily replaced.

Having thus explained the nature of my invention, and described an operative manner of constructing and using the same, although without attempting to set forth all of the forms in which it may be made, or all of the forms of its use, what I claim is:—

1. An antiskid mat of the character described, comprising spaced apart tread members and an intermediate tread member formed of flexibly connected rings and links and connected with each other to provide opposite gaps in the side edges of the mat, stays for the said gaps, each stay being formed of flexibly connected rings and links arranged in the form of a triangle and connected with the tread members, and means for attaching the mat to a vehicle wheel.

2. An antiskid mat of the character described, comprising spaced apart tread members and a narrower intermediate tread member, said tread members being formed of flexibly connected rings and links and connected with each other to form opposite gaps in the side edges of the mat, diagonally disposed stays connecting the intermediate tread member with the spaced apart tread members, longitudinal stay members connecting the outer ends of the first mentioned stays, and means for attaching the mat to a vehicle wheel.

3. An antiskid mat of the character described, comprising spaced apart tread members formed of a plurality of spaced apart flexibly connected rings, an intermediate tread member also formed of a plurality of spaced apart flexibly connected rings, and flexibly connected with the spaced apart tread members to form gaps in the side edges of the mat, stay chains connecting the ends of the intermediate tread section with the rings of the spaced apart tread sections at points on the opposite sides of the respective gaps, stay chains spanning the gaps and connecting the last-mentioned rings, and means for attaching the mat to a vehicle wheel.

4. An antiskid mat of the character described, comprising spaced apart tread members formed of a plurality of spaced apart flexibly connected rings, an intermediate tread member also formed of a plurality of spaced apart flexibly connected rings, said tread members being connected to form gaps in the side edges of the mat, stay members in said gaps, each stay member being formed of chains arranged in the form of a triangle and connected with all of the tread members, and means for attaching the mat to a vehicle wheel.

In testimony whereof I have hereunto set my hand in presence of two subscribing witnesses.

GEORGE J. MOTTER.

Witnesses:
 HENRY W. OFFUTT,
 ANDREW OFFUTT.